United States Patent [19]

Bogard et al.

[11] Patent Number: 5,205,465
[45] Date of Patent: Apr. 27, 1993

[54] METHOD FOR REPLACING WORN AIRSEAL LANDS ON ENGINE COMPRESSOR OR TURBINE DISKS

[75] Inventors: Ralph B. Bogard, North Palm Beach; Robert W. Baumgarten, Palm Beach Gardens; John M. Robertson, Tequesta, all of Fla.

[73] Assignee: United Technologies Corporation, Hartford, Conn.

[21] Appl. No.: 595,342

[22] Filed: Sep. 19, 1990

[51] Int. Cl.⁵ .......................... B23P 6/00; B23K 31/02
[52] U.S. Cl. ............................ 228/119; 29/889.1; 29/402.13; 228/171; 228/234
[58] Field of Search ............... 228/119, 171, 265, 234; 29/889.1, 402.13

[56] References Cited

U.S. PATENT DOCUMENTS

| 3,519,503 | 7/1970 | Moore et al. | 148/11.5 |
|---|---|---|---|
| 4,043,498 | 8/1977 | Conn, Jr. | 228/265 |
| 4,141,484 | 2/1979 | Hamilton et al. | 228/265 |
| 4,176,433 | 12/1979 | Lee et al. | 228/171 |
| 4,285,108 | 8/1981 | Arrigoni | 29/889.1 |
| 4,873,751 | 10/1989 | Walker et al. | 29/156.8 B |
| 4,883,216 | 11/1989 | Patsfall | 228/119 |
| 4,934,583 | 6/1990 | Patsfall | 228/119 |

FOREIGN PATENT DOCUMENTS 2063136 6/1981 United Kingdom ............... 228/265

OTHER PUBLICATIONS

*Metals Handbook*, "Welding, Brazing, and Soldering", vol. 6, 9th Edition, 1983, pp. 676–677.

Primary Examiner—Kurt Rowan
Assistant Examiner—Jeffrey T. Knapp
Attorney, Agent, or Firm—Herbert W. Mylius

[57] ABSTRACT

A method is taught for the replacement of turbine disk airseal lands, whereby a replacement land ring is solid state bonded to the disk in place of a worn or damaged land.

11 Claims, 6 Drawing Sheets

500x MAGNIFICATION
KALLINGS' ETCHANT

1000x MAGNIFICATION
KALLINGS' ETCHANT

METHOD FOR REPLACING WORN AIRSEAL LANDS ON ENGINE COMPRESSOR OR TURBINE DISKS

TECHNICAL FIELD

This invention relates to repair of airseal lands on engine compressor disks or turbine disks, with specific application to jet engine.

BACKGROUND

A gas turbine engine includes a compressor section, a combustion section, and a turbine section. Disposed within the turbine section and combustion section are alternating rows of rotatable blades and static vanes. These stationary vanes, disposed between rows of rotating blades, stabilize and direct the gas flow from one row of rotating blades to the next row. Such gas flow stabilization optimizes the flow of gas, thereby maximizing the amount of work extracted.

The blades are normally distributed about the periphery of the plurality of rotors or disks, turning a shaft which drives the compressor and other auxiliary systems. The most common rotor design used today in high temperature, high speed applications, such as in gas turbine engines for jet aircraft, comprises a hub with blades or airfoils mechanically attached to the hub rim, such as by the use of the well known dovetail and firtree shaped roots. The alloy used for the hub, or disk is selected to meet the requirements of high tensile strength and good low cycle fatigue resistance. Such properties are found, for example, in fine grain equiaxed superalloy materials. Turbine or compressor disks typically have raised portions, or protrusions, circumferentially around the face thereof in contact with knife-edge airseals, so as to prevent air flow from the rim of the disk to the center thereof, to maintain compressor and/or turbine efficiency. These protrusions are referred to as airseal lands. In general, two airseal lands are utilized, which are referred to as the inner and outer airseal lands.

Knife-edge airseals, which contact the airseal lands, are typically made from Inconel 901, and have a machined double-acting static seal lip. This seal lip rides against the vertical circumference of the airseal land of the disk. In service, abrasion and wear occur, resulting in wear grooves on the disk or compressor airseal land. When this wear exceeds a predetermined value, typically 0.012 inch in depth, the engine may lose efficiency and performance, due to air leakage. In addition, airseal lands may undergo distortion, stretching, and elongation during operation, since typical engine operating temperatures in the 600°-1200° F. range exist at the airseal land location of the disk. Consequently, it is an objective of the present invention to provide a method for repair of the inner and outer airseal lands.

In the compressor and turbine sections of gas turbine engines, wrought superalloys of nickel, and titanium alloys are used. Joining processes available for such alloys are limited due to the requirement to maintain mechanical properties in the repaired condition at elevated temperatures. Inertia welding is not a suitable repair technique for such situations, since the repair must be performed on finish machined hardware, and an inertia weld repair would result in significant concentricity and distortion problems due to high load requirements. It is an objective of this invention to provide a solid state joining process, such as forge-joining, where joining is performed at a temperature within the solution temperature range of the alloy of the disk, but below the incipient or bulk metal melting temperature, to provide a solid state bonding of the replacement airseal land.

SUMMARY OF THE INVENTION

In both the compressor and turbine sections of modern jet engines, components are operated at or near the outer limits of their capabilities with respect to both temperature and stress. Accordingly, any repair technique with respect to such components must provide repairs which have the strength and temperature capabilities of said components. Other requirements of the components, such as fatigue resistance, resistance to rupture, abrasion resistance, and life span must also be met. The need for repair may arise both in-service and in the initial fabrication of the engine components. Further, subsequent design change or modification may make it desirable to modify or replace a given component to achieve greater efficiencies, greater reliability or longer life.

The present invention relates to a method for the repair or replacement of airseal lands on gas turbine engine rotor disks, where such disks are composed of wrought nickel-base superalloys, or titanium alloys. According to the present invention, a replacement airseal land ring, preferably but not necessarily of similar chemical composition as the disk material, is forge-joined in place by locally heating the interface surfaces of the replacement ring and the stub remaining after removal of the damaged ring, and forming a solid state joint between the replacement land ring and the disk material. After joining, a localized heat treatment may be performed using selective heating methods to assure the interfacial bond joint having the desired microstructure and properties, or an appropriate isothermal post bond heat treatment may be performed on the alloys. After heat treating, the new airseal land is ready for machining to the final configuration. It is thus an object of the present invention to provide a means for replacement of a damaged airseal land. It is a further object of the present invention to provide a means for salvaging a rotor or disk hub which might otherwise be scrapped due to wear of the airseal land.

These and other objects and advantages of the present invention will become more readily understood through reference to the following description of the drawings and preferred embodiments.

DETAILED DESCRIPTION OF THE INVENTION

The present invention provides a method for the repair of broken, damaged, improperly machined, or worn airseal lands on a compressor or turbine disk, where such lands are made of high strength, high temperature materials such as nickel-base superalloys, or titanium alloys, and also provides a method for the replacement of such lands when appropriate. The invention will be described with reference to the drawings, which illustrate the repair sequence and technique. While the figures are illustrative of a turbine hub, it should be noted that the present invention is equally applicable to compressor disks, turbine disks, etc., wherein the central portion of the rotor is planar. Materials for the rotors/disks to which the present invention relates are selected in accordance with the requirements of the specific component involved. For example, applicable alloys for disks in the compressor section of a gas turbine engine include titanium-base materials such as Ti-6Al-4V, Ti-6Al-2Sn-4Zr-6Mo, Ti-6Al-2Sn-4Zr-2Mo, Ti-8Al-1Mo-1V, Ti-3Al-2.5V, Ti-5Al-2.5Sn. Applicable alloys in the turbine section would include nickel-base alloys such as In-100, Astroloy, Waspaloy, Merl 76, Inconel 718, Udimet 700, AF2-IDA, Incoloy 901, etc. The repair materials, i.e. the material of choice for the replacement airseal land, should be selected so as to form a strong solid state bond with the material of the disk or hub material. The preferred material would be, of course, the same material as the base material of the disk or hub.

Figure 1:
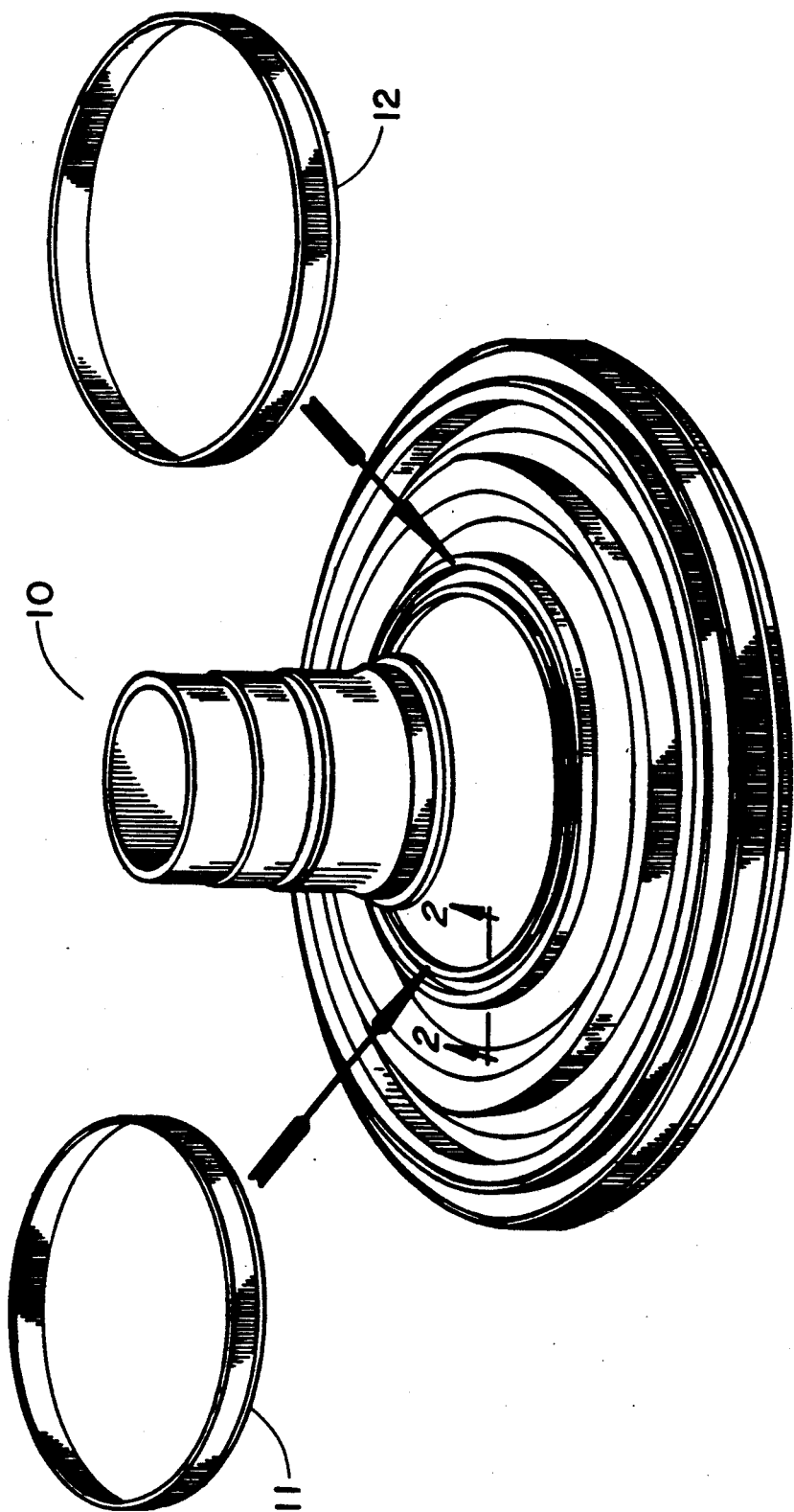
FIG. 1 is a perspective view of a disk, illustrating the inner and outer airseal lands.

With reference to the figures, a turbine hub is illustrated in FIG. 1, showing the disk or rotor assembly 10, having thereupon raised inner airseal land 11, and outer airseal land 12.

Figure 2:
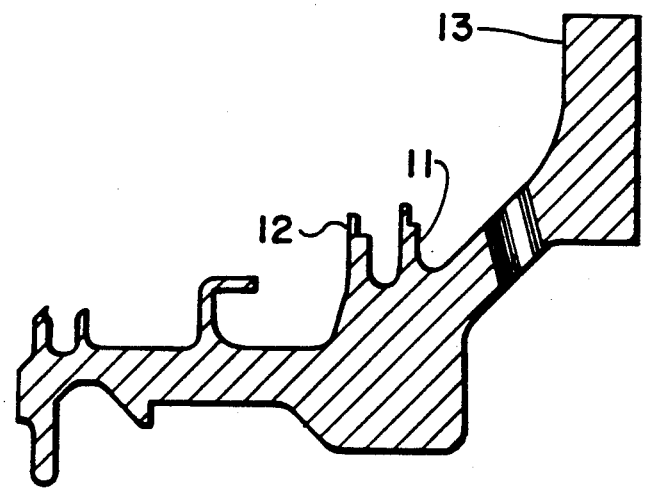
FIG. 2 illustrates the configuration of the disk and inner and outer lands.

FIG. 2, in cross-section, illustrates the disk, 13, and the inner and outer airseal lands, 11 and 12.

Figure 3:
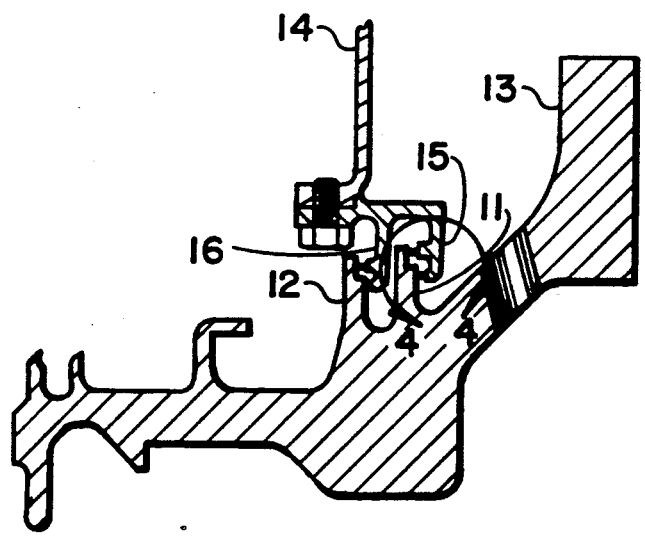
FIG. 3 illustrates the disk, lands, and associated airseal.
Figure 4:
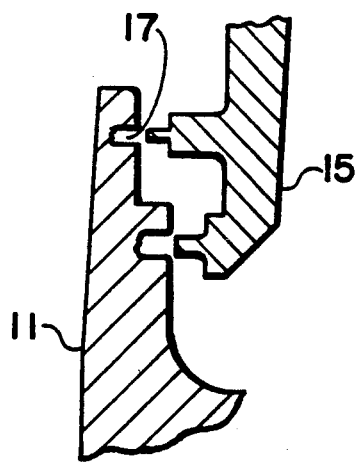
FIG. 4 represents a detail of the airseal/land contact.

In FIG. 3, disk 13 is shown with airseal assembly 14, comprising inner airseal knife-edge 15 and outer airseal knife-edge 16. As illustrated in FIG. 4, an enlargement of the contact area of the inner airseal land 11 and the inner airseal knife-edge 15, the rubbing contact of these surfaces causes grooves to be cut directly into the surface of the airseal land. When such grooves, 17, reach some predetermined depth, it becomes necessary to replace the airseal land due to increased air leakage and decreased efficiency.

In accordance with the present invention, when the airseal lands have reached the point where replacement is appropriate, or in the event of damage to an airseal land during machining, assembly, or use, it is necessary to remove the original airseal land so as to replace it with new material. This may be accomplished by conventional means, such as machining, to leave a stub, to which the new airseal land may be attached. The height of the stub should typically be from about 0.100 to about 0.200 inch.

Figure 5:
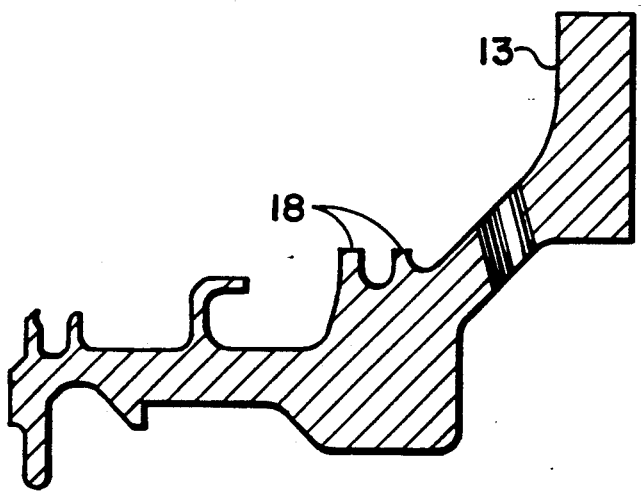
FIG. 5 illustrates the disk with damaged inner and outer airseal lands removed for replacement.

FIG. 5 illustrates the disk assembly of FIG. 2, with worn airseal lands 11 and 12 removed, leaving repair site stubs 18. These stubs should preferably be machined to a relatively uniform smoothness of from 10 to 30 microinches.

Figure 6:
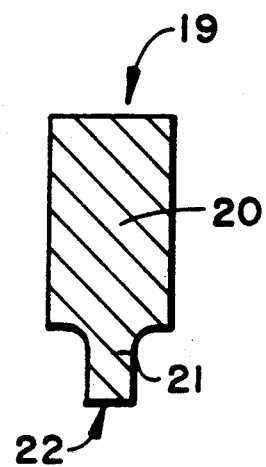
FIG. 6 illustrates the cross-section of the replacement outer land ring.
Figure 8:
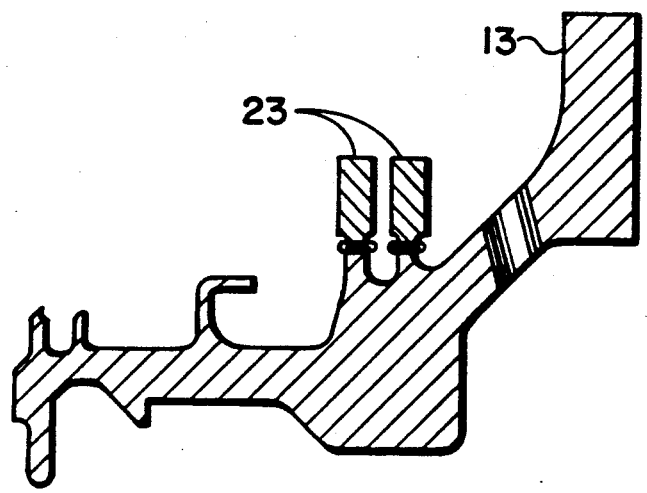
FIG. 8 illustrates a disk having replacement airseal lands bonded in place.
Figure 9:
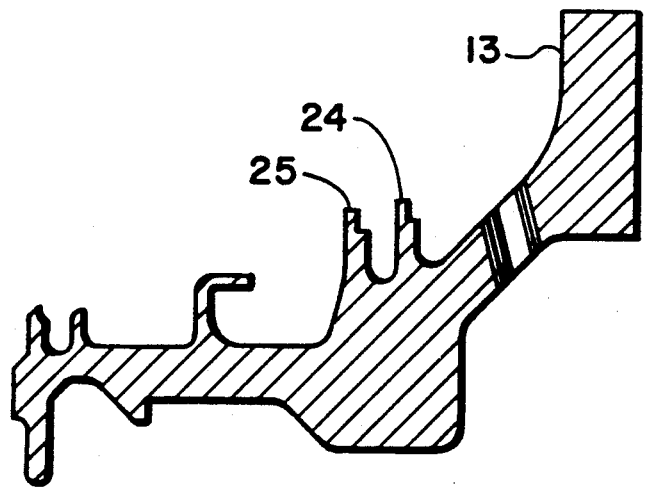
FIG. 9 represents the disk having the replacement land seals re-machined to the original configuration.

FIG. 6 illustrates, in cross-section, a replacement ring to be bonded to the stubs 18. This replacement ring, 19, comprises an oversized load bearing upper section 20, a lower section, 21, sized to match the stub of the original airseal land which is to be replaced, and a bonding surface 22. The purpose of the oversized area 20 is to enable one to localize pressure in the narrower region 21, so as to achieve a greater degree of upset at bonding surface 22. The replacement ring is placed in location on the appropriate stub of the inner airseal land or outer airseal land, and forge-joined thereto, as will be hereinafter set forth, to yield a bonded disk and airseal land assembly, 23, such as is illustrated in FIG. 8, which also illustrates the upset at the interfacial bond line. The newly bonded oversized replacement airseal land may now be heat treated, using a localized heat treatment to assure the airseal land interfacial bond joint having the desired microstructure and properties. An appropriate low temperature aging isothermal post bond heat treatment may be performed depending upon the alloys involved in the specific repair. After heat treatment, the new airseal land ring is now ready for machining to the final configuration, as illustrated in FIG. 9, wherein replacement airseal lands, 24 and 25, have been bonded to disk 13, and machined to the appropriate configuration for use.

Figure 7:
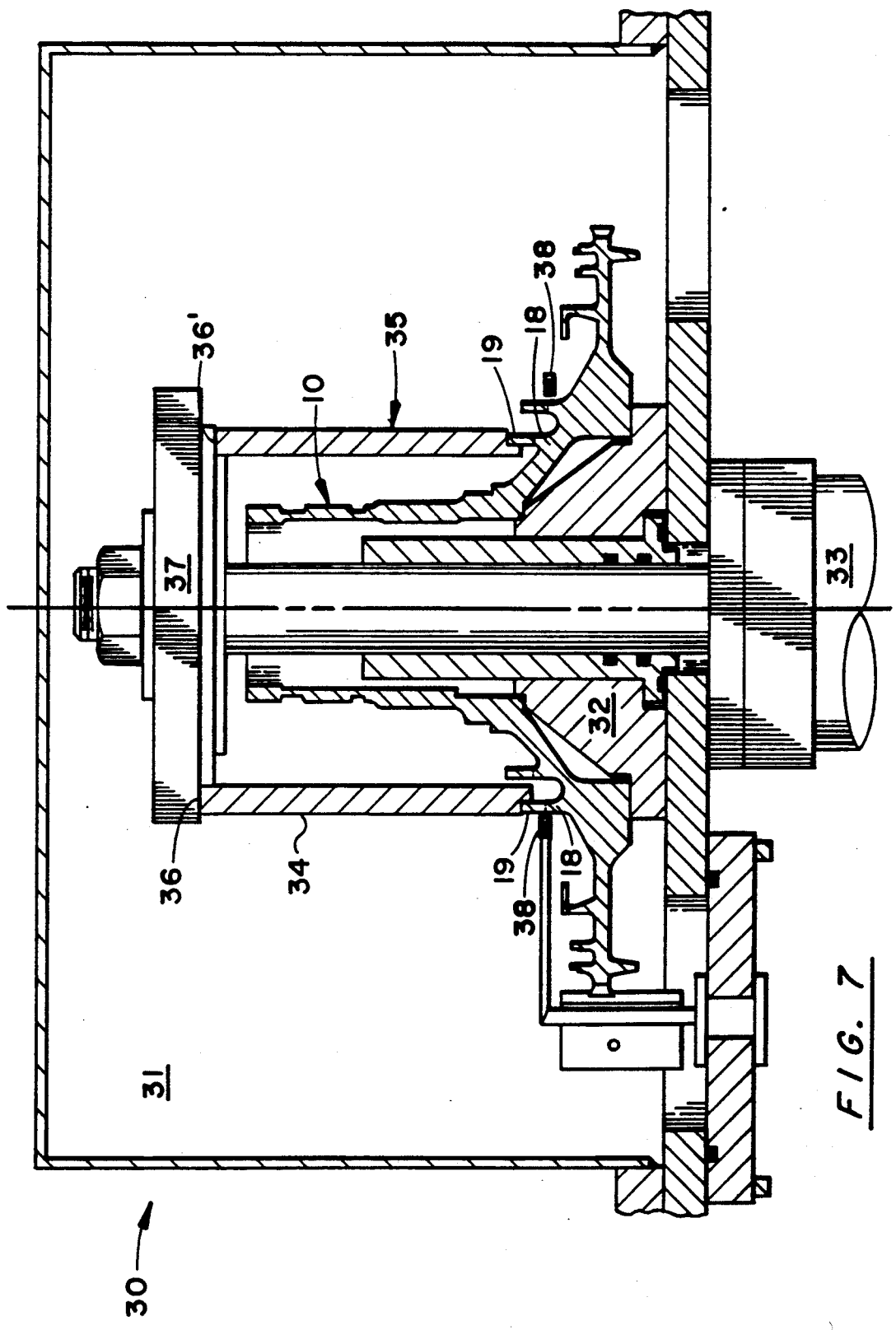
FIG. 7 illustrates inner and outer airseal land repair tooling.

As previously indicated, the replacement ring 19 is bonded to the stubs 18 by forge-joining, which may be accomplished in suitable forging means such as generally indicated in FIG. 7. It is to be understood that FIG. 7 is meant to represent a typical appropriate press. The term "press" as used in this specification and appended claims is intended to encompass any device for forcing the components together under very high pressures and temperatures, such as an apparatus for hot isostatically pressing the components, or a forging press. The components are heated within the press to a temperature sufficient to put at least the replacement ring in a superplastic or highly deformable condition. Sufficient pressure is then applied to the components to cause the replacement ring to deform at its bonding surface to create line-on-line contact over the entire bonding surface of the replacement ring and the stub to which it is being applied. The high pressure and temperature are held until a solid state diffusion bond is achieved.

FIG. 7 illustrates a forge-joining tooling suitable for the present invention, comprising a press, 30, having a vacuum chamber 31. Disk or hub assembly, 10, is mounted on fixture 32, mounted upon hydraulic cylinder 33, positioned so as to provide pressure to the fixture and disk assembly. FIG. 7 illustrates, schematically, tooling for repair for both the outer airseal land (on the left side of the centerline of the figure) and tooling for the inner airseal land (on the right side of the centerline). It is to be noted that in service, typically both the inner and outer airseal lands wear to the same extent, and would in the great majority of instances require replacement at the same time. In such circumstances, the inner airseal land would be replaced first.

Before placement in the tooling, the bonding surfaces of the disk assembly, i.e. the land stubs, and the replacement airseal lands are prepared for bonding. As previously indicated, the stubs on the hub or disk assembly 10 should be ground to relative smoothness, i.e. 10 to 30 microinches. The corresponding bonding surface, 22, of the replacement ring 19 should likewise be machined to relative smoothness. Any conventional metal removal technique is suitable, so long as a relatively smooth and uniform surface is achieved. The intended bonding surfaces of both the stubs and the replacement rings should then be treated to encourage bonding. This generally entails removal of all foreign materials, including dirt, grease, machining residue, etc., and surface oxidation. Such surface preparation may be accomplished by a variety of readily apparent techniques, such as mechanical surface grinding and cleaning, and selective chemical etching and washing. As previously noted, the replacement ring is sized so as to provide adequate material for machining the top portion thereof to the correct airseal land configuration, and with a necked-in lower portion, 22, which provides for greater concentration of forging pressures upon the bonding surface. This necked-in portion is desirably sized to fit the airseal land stubs 18, within close tolerance. After the replacement ring is positioned in close proximity to the bonding surface of the stub, the replacement airseal land is positioned in the correct location and held in place by the airseal land tool, 34 or 35. Airseal land tools 34 and 35 are positioned within the press 30 by appropriate means, such as an appropriate relief 36, or 36', within the upper pressure plate 37. Bonding tools 34 and 35, used in the inner and outer airseal land repairs, also act to dissipate heat transferred from the replacement land seal. The tooling is designed such that the structural integrity is not reduced by excessive bonding temperatures, and at the same time resists deformation during upset. Appropriate materials for such tooling will be apparent to those of ordinary skill in the art.

When the replacement lands have been appropriately positioned and located in the airseal land tooling, chamber 31 of press 30 is evacuated, preferably to a vacuum of from about $4 \times 10^{-5}$ to about $5 \times 10^{-5}$ Torr. The replacement land ring is then heated, by such means as an induction coil 38, powered by an induction generator (not illustrated). The coil is located in proximity to the bonding surfaces of the replacement land ring and the disk stub, positioned to provide the required bonding temperature about the circumference of the replacement airseal land ring. Sufficient clearance is provided between the coil and bond interface to allow for upset, while maintaining a narrow heat focus. The temperature of the bonding surfaces is raised to a temperature to assure metal deformation. Typically, this would require raising the temperature to temperatures within the solution range of the alloys employed. Obviously, the bonding temperatures will vary depending upon the specific alloys used in the compressor or turbine disk. Joining temperatures for superalloys are typically within about 200° F. of, but not exceeding, the solution heat temperature of the material of the disk, without causing local melting thereof. Temperatures of from about 1700° F. to about 2100° F. are suitable in the case of nickel-base superalloys, while temperatures of from about 1500° F. to about 1900° F. are suitable for titanium alloys. The proper temperature for any specific materials to be bonded will be easily determined by one of skill in the art. The replacement ring and disk assembly must be maintained in true alignment during the heat-up and upset cycles. The hydraulic pressure, for upset, and the electrical current, for heating, must be individually controlled to obtain a gradual, predetermined upset of the replacement ring and disk stub.

Pressures of from about 20 to about 30 ksi are applied to the repair tooling by means of hydraulic cylinder 33, when superalloys are utilized. In the case of titanium-base materials, pressures of 2 to 12 ksi are sufficient to assure sufficient metal deformation. An upset of from about 0.150 to about 0.250 inch is appropriate for using nickel-base superalloys, while an upset of from about 0.050 to 0.100 inch is suitable for a titanium-base material. Such upsets are sufficient to place the rings to be joined in intimate contact around the bond interface and to promote high interfacial diffusion. Higher upsets are required for nickel-base superalloys than for titanium-base alloys, to maximize the expulsion of the more deleterious oxides from the bond interface. After bonding, the pressure may be released from hydraulic cylinder 33, and the bonded assembly subjected to local vacuum heat treatment to achieve lower temperature age/stress relief of the alloy. After heat treatment, the bonded assembly may be removed from the press, and machined to the appropriate configuration for use.

EXAMPLE 1

A rotor hub from a military aircraft engine was removed for replacement of inner and outer airseal lands after having been worn to a depth of greater than 0.012 inches by the Inconel 901 knife-edge airseals. The worn airseal lands were removed by machining, leaving 0.100 inch stubs. Replacement land rings were machined from the wrought superalloy Waspaloy, which was the same composition as the hub material. These rings were of a cross-sectional shape as illustrated in FIG. 6, with bonding surfaces 22 the same dimensions as the bonding surfaces of the stubs on the turbine hub. After the bonding surfaces were finished to a smoothness of 20 microinches and chemically cleaned and etched, the inner replacement ring and the turbine hub were positioned in a press as illustrated in FIG. 7. After evacuation to $4 \times 10^{-5}$ Torr, the temperature of the interface of the bonding surfaces was raised by means of induction heating to a temperature within the solution range of the alloy, but without causing localized melting, while a pressure of 20 ksi was applied to achieve an upset of 0.200 inch. The outer replacement land ring was bonded to the outer land stub in like fashion. After both rings were bonded, a localized vacuum heat treatment low temperature age was provided to the bonded hub and replacement land rings. After cooling, the bonded assembly was removed from the press, inspected, and found to have solid state bonds for the full circumference of both replacement lands. The lands were then machined to the proper configuration, and the repaired turbine hub was considered ready for replacement in the engine.

EXAMPLE 2

To test the strength of a bond formed as in the example above, coupons of IN-100 superalloy were bonded in accordance with the teachings of this invention. A high integrity bond was achieved. Tensile testing of the sample at 500° F. shows a yield strength of 146,700, ultimate tensile strength of 215,000, and reduction in cross-sectional area of 34.6%. Estimated specifications of IN-100, extrapolated from data at room temperature and at 1000° F., give values of 151,000 for yield strength, 208,000 for ultimate tensile strength, and 10.0% reduction in cross-sectional area at the 500° F. test temperature. Thus, the solid state bond repair was able to provide 97% of the required specification yield strength, and 100% of the ultimate tensile strength and reduction in area at the 500° F. test temperature.

EXAMPLE 3

Figure 10:
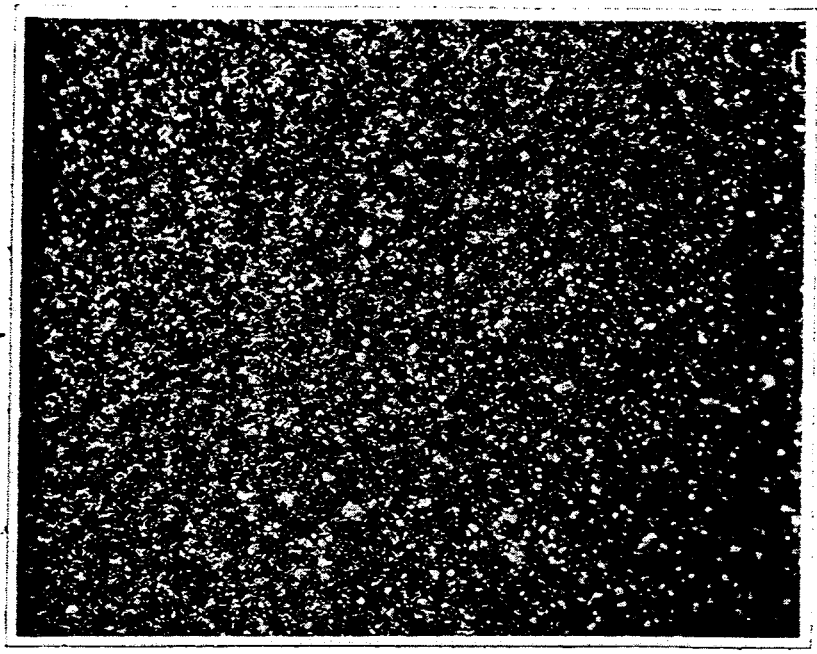
FIG. 10 is a photomicrograph of a simulated land repair test specimen at 500X magnification.
Figure 11:
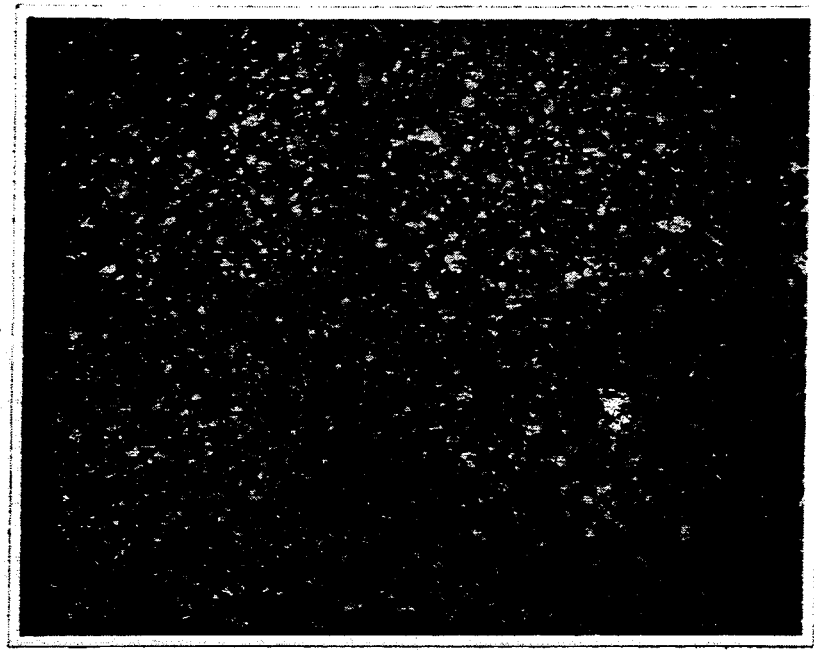
FIG. 11 represents a photomicrograph of a simulated land repair test specimen at 1000X magnification.

Test coupons of IN-100 superalloy were bonded in accordance with the teachings of this invention. A very high integrity bond was achieved, as illustrated in FIGS. 10 and 11, which are photomicrographs of the bond line, at 500X and 1000X magnification, respectively.

It is to be understood that the above description of the present invention is subject to considerable modification, change, and adaptation by those skilled in the art, and that such modifications, changes, and adaptations are to be considered to be within the scope of the present invention, which is set forth by the appended claims.

We claim:

1. A method for the replacement of an airseal land on a disk, said disk comprising a compressor or turbine disk manufactured of a wrought nickel-base superalloy or titanium alloy, said method including the steps of:
    a) removing a pre-existing airseal land, leaving a stub portion thereof to provide a bonding surface to which a replacement airseal land ring may be bonded;
    b) preparing a replacement airseal land ring of a wrought alloy selected so as to be readily forge joined to said stub, said replacement ring having a bonding surface of the same dimensions as said stub, and a cross-section having a narrower bonding surface than the load bearing upper section thereof;
    c) positioning the bonding surface of said replacement ring adjacent to the bonding surface of said stub, and drawing a vacuum around said bonding surfaces;
    d) applying a bonding force to said replacement ring and said stub;
    e) locally heating the interface between said replacement ring and said stub to a temperature within the solution range of the alloy of said replacement ring but not causing localized melting, to obtain a solid state bonding at said interface;
    f) removing said force and subjecting the bonded assembly to an isothermal vacuum heat treatment so as to optimize properties thereof;
    g) removing said bonded assembly, and machining the replacement airseal land to the desired final configuration.

2. A method as set forth in claim 1 wherein said disk and said replacement ring comprise a nickel-base superalloy.

3. A method as in claim 2, wherein said disk and said replacement ring comprise an alloy selected from the group consisting of IN-100, Astroloy, Waspaloy, Merl 76, Inconel alloys, Udimet alloys, and AF2-IDA.

4. A method as set forth in claim 3, wherein said interface is subjected to a temperature of from about 1700° F. to about 2100° F., and a pressure of from about 20 ksi to about 30 ksi.

5. A method as set forth in claim 4, wherein said interface is subjected to an upset of from 0.150 to 0.250 inch.

6. A method as set forth in claim 1, wherein said disk and said replacement ring comprise a titanium alloy.

7. A method as set forth in claim 6, wherein said interface is subjected to a temperature of from about 1500° F. to about 1900° F., and a pressure of from about 2 ksi to about 12 ksi.

8. A method as set forth in claim 7 wherein said interface is subjected to an upset of from about 0.050 to about 0.100 inch.

9. A method as set forth in claim 1 wherein said airseal land is the inner airseal land.

10. A method as set forth in claim 1 wherein said airseal land is the outer airseal land.

11. A method as set forth in claim 1, wherein both the inner and the outer airseal lands are replaced.

* * * * *